United States Patent [19]

Moon-Hwan

[11] Patent Number: 5,023,721
[45] Date of Patent: Jun. 11, 1991

[54] TV OF INTERNAL PIP TYPE FOR RECEIVING THE CHARACTER MULTIBROADCASTING

[75] Inventor: Seo Moon-Hwan, Seoul, Rep. of Korea

[73] Assignee: SamSung Electronics Co. Ltd., Suwon, Rep. of Korea

[21] Appl. No.: 378,915

[22] Filed: Jul. 12, 1989

[30] Foreign Application Priority Data

Dec. 12, 1988 [KR] Rep. of Korea ............... 88-16612

[51] Int. Cl.⁵ .............. H04N 7/87; H04N 5/268; H04N 5/262; H04N 5/272
[52] U.S. Cl. ............................... 358/147; 358/181; 358/183
[58] Field of Search ............ 358/22, 142, 147, 181, 358/183

[56] References Cited

U.S. PATENT DOCUMENTS

| | | | |
|---|---|---|---|
| 4,663,668 | 5/1987 | Rabii et al. | 358/181 |
| 4,665,438 | 5/1987 | Miron et al. | 358/181 |
| 4,680,629 | 7/1987 | Fukushima et al. | 358/147 |

Primary Examiner—John W. Shepperd
Assistant Examiner—Michael D. Parker
Attorney, Agent, or Firm—Robert E. Bushnell

[57] ABSTRACT

The invention provides a TV of internal PiP type for receiving the character multibroadcasting which installs the character multiblock having PiP block which is constructed so that a complex signal or a composite image signal of the IF circuit are selected at a switching board and is applied to a Y/C processor and a PiP processor, the device comprising, a teletext-processing circuit for providing a composite synchronization signal and RGB signal after extraction and decoding of the character multiinformation included in the composite image signal which is provided from the intermediate frequency(IF) circuit an encoder for providing a first composite image signal by encoding said composite synchronization signal and RGB signal, and a switch for providing the composite image signals provided from said IF circuit and the encoder, respectively, to the switching board by switching of a control signal provided from the teletext-processing circuit. Diversifying capabilities more than the receipt of simple character multibroadcasting or the conventional PiP may be possible and watching simultaneously both video signal and character multiinformation may be attained according to the present invention.

6 Claims, 2 Drawing Sheets

TV OF INTERNAL PIP TYPE FOR RECEIVING THE CHARACTER MULTIBROADCASTING

BACKGROUND OF THE INVENTION

The present invention relates to a TV of internal PiP (Picture in Picture)type for receiving the character multibroadcasting in which the character multiinformation can be seen and heard on the PiP screen.

In the past, the TV for the receipt of the character multibroadcasting is separately constructed about the TV with PiP capability, so that the separate character multibroadcasting or PiP screen is received, while the character multiinformation can't be watched in company with the video signal.

That is, the TV with the receiving capability of the character multibroadcasting can select either the video signal or the character multiinformation to watch, but both video signal and character multiinformation can not be watched at the same time. Also, the TV with PiP capability can show two video screen, but not show the character multiinformation.

SUMMARY OF THE INVENTION

An object of the present invention is to provide a TV of internal PiP type for receiving the character multibroadcasting, in which both video signal and character multiinformation are watched on the PiP screen at the same time by adding the PiP capability to the TV with receiving capability of the character multiinformation.

According to the present invention, there is provided a TV of internal PiP type for receiving the character multibroadcasting which installs the character multiblock having PiP block which is constructed so that the complex signal and the complex image signal of the IF part are selected at the switching board and is applied to the Y/C processor and PiP processor, the device comprising: a teletext-processing part for providing the complex synchronization signal and RGB signal after extraction and decoding of the character multiinformation included in the complex image signal which is provided from the intermediate frequency (IF) part and switching board, and encoder for providing the complex image signal by encoding the complex synchronization signal and RGB signal, and a switching part for providing the complex image signals provided from the IF part and the encoder to the switching board by switching of the control signal provided from the teletext-processing part.

DETAILED DESCRIPTION OF THE INVENTION

The present invention will be now described in more detail with reference to accompanying drawings.

Figure 1:
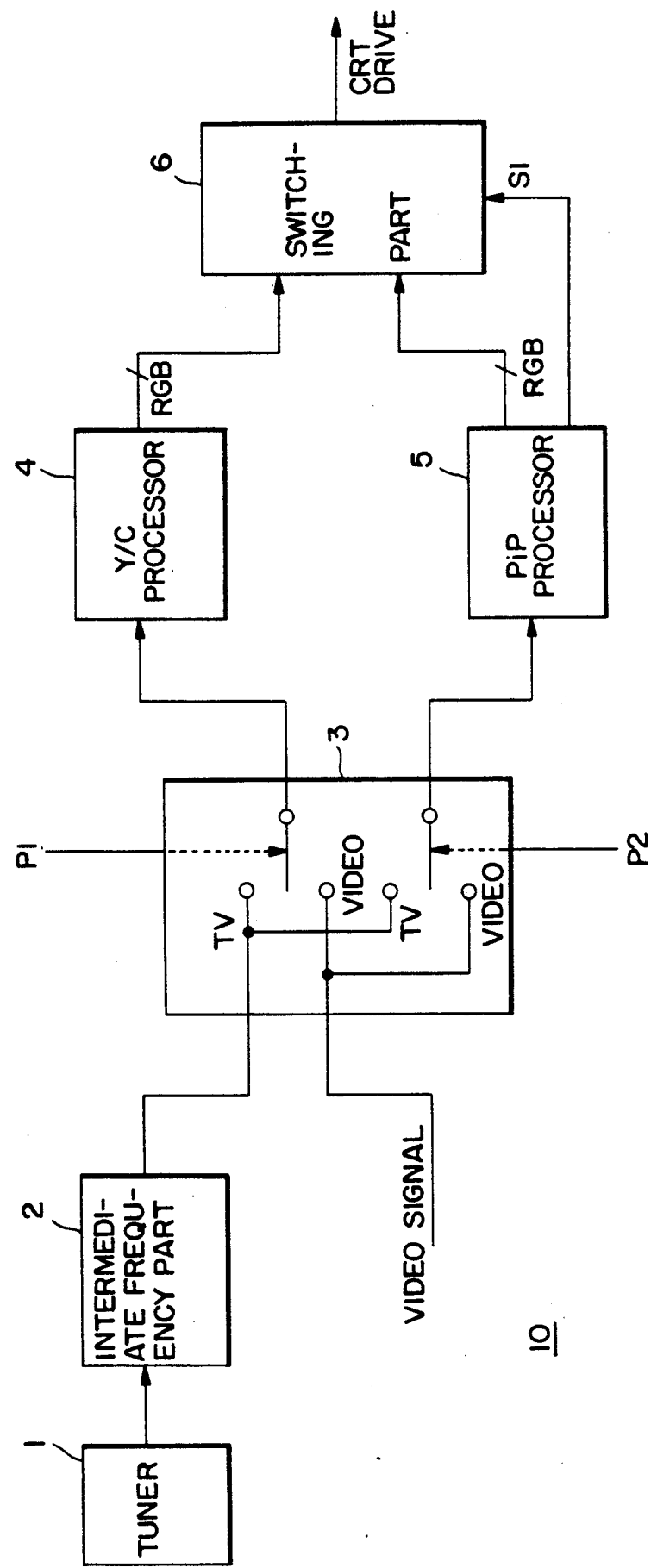
FIG. 1 is a conventional PiP block diagram.

FIG. 1 shows the conventional PiP block diagram, where an IF signal provided from a tuner 1 is amplified to be detected through an IF part 2 and is applied to a second switching part 3 as a composite image signal, and the composite image signal is switched with an video signal at the second switching part 3 which is controlled by control signals P1 and P2 of a MICOM, then, it is applied to a Y/C processor 4 and the PiP processor 5.

That is, the composite image signal and video signals provided from the IF part 2 are switched by control signals P1 and P2 of the MICOM at the second switching part 3, and it is applied to the Y/C processor 4 and the PiP processor 5. Thus, the Y/C processor 4 separates, first, the brightness Signal (Y) and the color signal C from the composite image signal and provides it to a third switching part 6 as the RGB signals, after the valanced-demodulation. And, the PiP processor 5 receives the composite image signal and provides it to the third switching part 6 after PiP processing.

The third switching part 6 controlled by the control signal S1 coming from the PiP processor 5 switches said RGB signals to provide to CRT driver.

The PiP block which provides the final PiP signal through the switching third part 6 is the conventional technology and the present invention installs a character multiblock 20 between the composite image signal input stage in the PiP block and the IF part 2.

Figure 2:
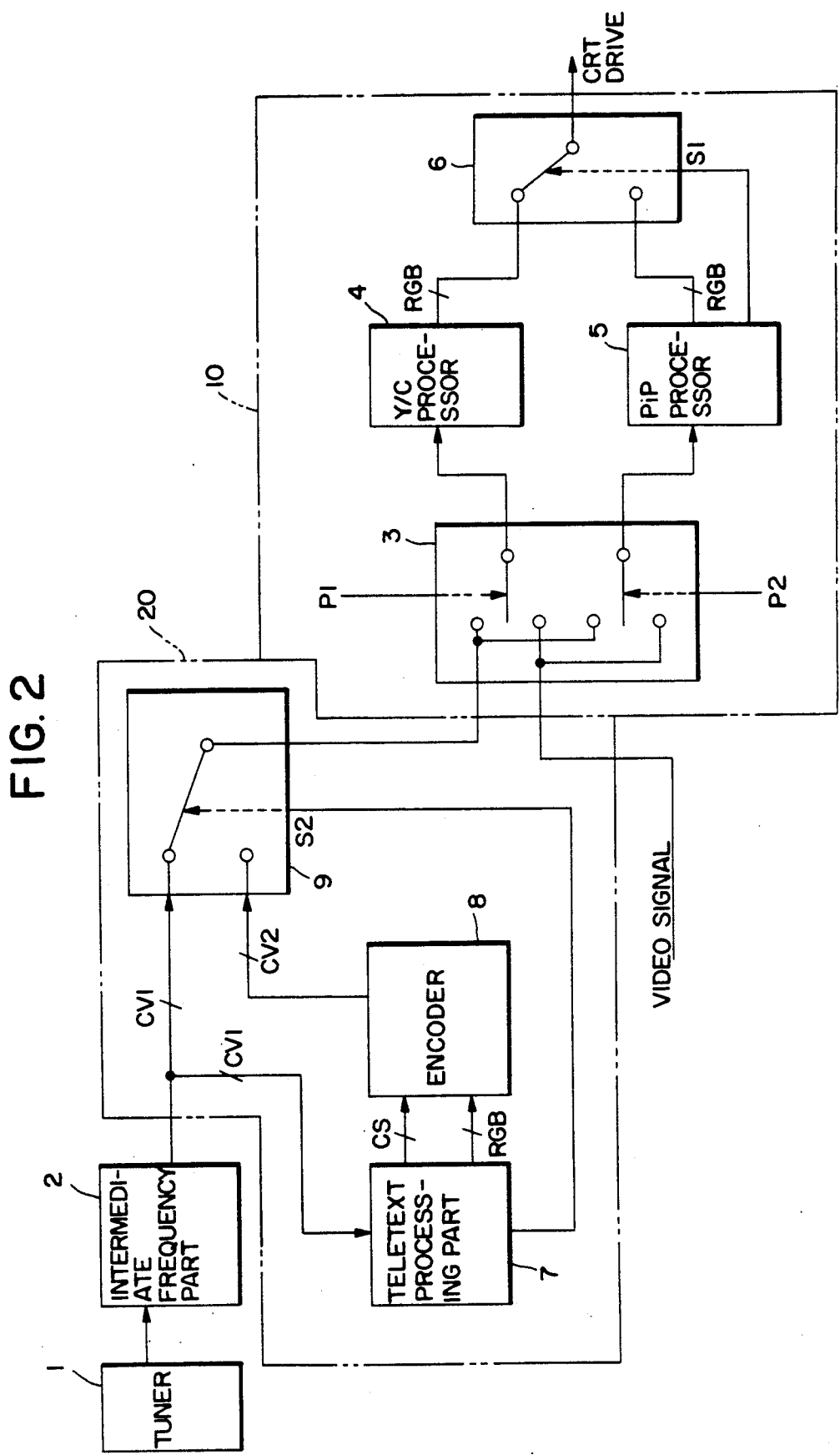
FIG. 2 is a circuit diagram of present invention.

That is, the character multiblock is constructed so that the composite image signal CV1 of the IF part 2 is applied to the first switching part 9 which is switched by a control signal S2 of the teletext-processing part 7, and it is also applied to the teletext-processing part 7, thereby providing a composite synchronization signal CS and RGB signal to an encoder 8 after the extraction of the character multidatas, as shown in FIG. 2. The encoder 8 provides it to the first switching part 9 as the composite image signal CV2 after encoding the two signals. Then, the first switching part 9 selects either the composite image signal CV1 or CV2 by the control signal S2 of the teletext-processing part 7.

In short, the present invention installs the character-multiblock 20 consisting of the teletext-processing part 7 for providing RGB signal and the composite synchronization signal CS after extracting and decoding the character-multidata in the composite image signal CV1, during vertical blanking inlet, the encoder 8 for providing the composite image signal by encoding of said two signals, and the first switching part 9 for switching between the composite image signal CV2 of the encoder 8 and CV1 of the IF part 2 by the control signal S2 of the teletext-processing part 7, between the IF part 2 and the input stages of the switching board 3 in the PiP-block 10.

In the present invention as this, the PiP block will be first described.

The IF signal applied from the tuner 1 is amplified and detected at the IF part 2 in order to form the composite image signal. This composite image signal is applied to the second switching part 3 and switched by the control signal P1 and P2 provided from the video signals and the MICOM, and it is applied to either the Y/C processor 4 or the PiP processor 5.

The Y/C processor 4 separats the brightness signal and color signal from the composite image signal and provides it to the third switching part 6 as the RGB signal after balanced-demodulation. The PiP processor 5 receives either the composite image signal or the video signal of the IF part 2 from the switching board 3, and provides the RGB signal and the control signal S1 after the PiP-processing.

The third switching part 6 switches the RGB signals of the Y/C processor 4 and the PiP processor 5 by the control signal S1 and provides it to the CRT driver.

The present invention installs the character multiblock 20 between the IF part and the input stage of switching part 3, so that the composite image signal CV1 privided from the IF part 2 is not directly applied to the second switching part 3 as shown in FIG. 2, that is, it is applied as the conventional composite image signal or the character multiinformation through the character multiblock 20. Thus, the composite image signal CV1 of the IF part 2 is applied to the first switching part 9 and the teletext-processing part 7 at the same time. The teletext-processing part 7 applies the composite synchronization signal CS consisting of the horizontal and the vertical syncronization signals and the RGB signals to the encoder 8 after extracting and decoding the character multidata from said composite image signal CV1.

The encoder 8 encodes the composite syncronization signal CS and the RGB signals, and provides the encoded signal to the first switching part 9.

The first switching part 9 switches either the composite image signal CV1 detected at the IF part 2 or the composite image signal CV2 provided through the teletext-processing part 7 and the encoder 8 by the control signal S2 provided from the teletext-processing part 7, thereby selecting either the TV signal or the character multisignal and applying to second the switching part 3 of the PiP block.

In the past, the PiP block 10 provides the composite image signal and the video signal after the PiP-processing, so that the conventional PiP screen can be watched, while the character multiinformation can't be watched in company with the video signal. But, the present invention can process the video signal and the character multiinformation on the PiP screen since the PiP block 10 can select either the conventional TV signal or the character multiformation.

In the present invention, that is, the composite image signal coming out of the IF part 2 is applied to the character multiblock 20 and is switched in company with the character multisignal, and said composite image signal and the character multiinformation signal is applied to the PiP block 10, and they are selected by the MICOM as well as the video signal so that the character multiinformation and the video signal can be watched on the PiP screen.

As mentioned above, the present invention can provide more diversified capabilities than the capability of the receipt of simple character multibroadcasting or the conventional PiP, since both video signal and character multiinformation can be watched on the PiP screen at the same time.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A device for a television receiver of internal picture-in-picture type receiving character multibroadcasting for a character multiblock having a PiP block constructed so that a complex input signal and a complex image signal of an intermediate frequency part are selected at a switching board wherein one signal is selectably applied to a luminance/chrominance processor and the other signal is selectively applied to a picture-in-picture processor, the device comprising:

teletext-processing means for providing a complex synchronization signal and color signals after extraction and decoding of the character multiinformation included in a first complex image signal provided from said intermediate frequency part, encoder means for providing a second complex imager signal by encoding said complex synchronization signal and color signals, and switching means for providing the first or second complex image signals provided from said intermediate frequency part and the encoder means respectively, to the switching board by switching of a control signal provided from the teletext-processing means.

2. An internal picture-in-picture television receiver for receiving multi-signal broadcasts, comprising:

tuning means for receiving composite image signals and providing selected image signals from among received composite image signals;

intermediate frequency means connected to said tuning means, for detecting intermediate frequency signals from among said selected image signals, and for providing first composite image signals based upon said selected image signals;

character multiplexing means connected to said intermediate frequency means, for extracting character signals from said first composite image signals, for providing second composite image signals based upon said character signals, and for selecting as output signals either said first or second composite image signals; and picture-in-picture display means coupled to said character multiplexing means, for performing chrominance and luminance signal processing and picture-in-picture processing, and selectively providing either external video signals or said selected output signals, to a driver of a video display for display as a sub-picture superimposed upon a larger picture upon the video display.

3. The internal picture-in-picture television receiver of claim 2, wherein the character multiplexing means comprises:

teletext processing means connected to the intermediate frequency means for providing composite synchronization signals and red, green and blue signals after decoding teletext data inserted into said first composite image signal during a vertical blanking interval, means connected to the teletext processing means for encoding said red, green and blue signals and the composite synchronization signals supplied from the teletext processing means and providing the second composite image signal with character signals; and first switching means connected to the teletext processing means, the intermediate frequency means and the encoding means, for selecting said output signals in dependence upon the first composite image signals and the second composite image signals and in response to control signals provided by said teletext processing part.

4. The internal picture-in-picture television receiver of claim 3, wherein the picture-in-picture display means comprises:

second switching means for selectively providing as selected signals either external video signals or said output signals;

luminance and chrominance processing means for processing selected signals to provide RGB output signals;

picture-in-picture processing means connected to the second switching means, for converting selected signals to provide sub-picture signals for forming said sub-picture; and third switching means coupled to said luminance and chrominance processing means and said picture-in-picture processing means, for selectively applying either said RGB output signals or said sub-picture signals to the driver in response to control signals provided by said picture-in-picture processing means.

5. The internal picture-in-picture television receiver of claim 2, wherein the picture-in-picture display means comprises:

first switching means for selectively providing as selected signals either external video signals or said output signals;

luminance and chrominance processing means for processing selected signals to provide RGB output signals;

picture-in-picture processing means connected to the first switching means, for converting selected signals to provide sub-picture signals for forming said sub-picture; and second switching means coupled to said luminance and chrominance processing means and said picture-in-picture processing means, for selectively applying either said RGB output signals or said sub-picture signals to the driver in response to control signals provided by said picture-in-picture processing means.

6. A television apparatus of picture-in-picture type, comprising:

a tuner and a IF part for receiving and providing a first complex image signal to a first input of a first switch and a teletext processing part;

said teletext processing part providing a composite sync signal and RGB signals to an encoder for developing a second complex image signal;

said encoder providing said second complex image signal to a second input of said first switch;

said first switch selectively supplying either the first or second complex image signal to a second switch under the control of a control signal provided from said teletext processing part;

said second switch also receiving a complex video signal and selectively supplying one of the selected signals from said first switch or said complex video signal to a Y/C processor and the other signal to a picture-in-picture processor, the outputs of these processors being used for display.

* * * * *

UNITED STATES PATENT AND TRADEMARK OFFICE
CERTIFICATE OF CORRECTION

PATENT NO. : 5,023,721
DATED     : June 11, 1991
INVENTOR(S) : Seo Moon-Hwan

It is certified that error appears in the above-indentified patent and that said Letters Patent is hereby corrected as shown below:

Column 4,    Line 5,    Change "imager" to --image-- .

Signed and Sealed this

Third Day of October, 1995

Attest:

BRUCE LEHMAN

Attesting Officer        Commissioner of Patents and Trademarks